United States Patent
Chopra et al.

(10) Patent No.: US 11,409,614 B2
(45) Date of Patent: Aug. 9, 2022

(54) SYSTEMS AND METHODS FOR MULTIPLE RECOVERY TYPES USING SINGLE BACKUP TYPE

(71) Applicant: EMC IP Holding Company LLC, Hopkinton, MA (US)

(72) Inventors: Shelesh Chopra, Bangalore (IN); Sunil Yadav, Bangalore (IN); Manish Sharma, Bangalore (IN); Aaditya Rakesh Bansal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 194 days.

(21) Appl. No.: 16/987,918

(22) Filed: Aug. 7, 2020

(65) Prior Publication Data
US 2022/0043719 A1 Feb. 10, 2022

(51) Int. Cl.
*G06F 12/00* (2006.01)
*G06F 11/14* (2006.01)

(52) U.S. Cl.
CPC ...... *G06F 11/1464* (2013.01); *G06F 11/1451* (2013.01); *G06F 11/1461* (2013.01); *G06F 11/1469* (2013.01)

(58) Field of Classification Search
CPC .............. G06F 11/1464; G06F 11/1451; G06F 11/1461; G06F 11/1469; G06F 3/0646; G06F 3/0647; G06F 3/065
See application file for complete search history.

(56) References Cited

U.S. PATENT DOCUMENTS

2009/0063430 A1* 3/2009 Anglin .................... G06F 16/40

\* cited by examiner

*Primary Examiner* — Shawn X Gu
(74) *Attorney, Agent, or Firm* — Chamberlain, Hrdlicka, White, Williams & Aughtry (57) ABSTRACT

Embodiments described herein relate to a technique for performing an enhanced backup and restore for a computing device. The method may include: receiving, at a backup management device, a request to perform an enhanced backup operation; creating, by the backup management device, an enhanced recovery asset including computing device data items and stored on a backup storage device; performing a backup operation of a volume of the computing device to obtain a first backup container; performing a backup operation of system state information associated with the computing device to obtain a second backup container; associating the first backup container and the second backup container with the enhanced recovery asset; receiving, by the backup management device, a second request to perform a recovery operation; and performing, based on the second request, the recovery operation using at least a portion of the enhanced recovery asset.

20 Claims, 4 Drawing Sheets

SYSTEMS AND METHODS FOR MULTIPLE RECOVERY TYPES USING SINGLE BACKUP TYPE

BACKGROUND

Computing devices often store data on one or more storage devices included in and/or operatively connected to the computing device. Computing devices may also include a variety of other hardware components. Such hardware components may fail, or be close to failing, from time to time, and/or be subject to other events, which may be termed as disasters, which render the computing wholly or partially unable to continue intended operation. Such potential failures may require performing restore operation from backup information stored separately from the computing device.

SUMMARY

In general, embodiments described herein relate to a method for performing an enhanced backup and restore for a computing device. The method may include: receiving, at a backup management device, a first request to perform an enhanced backup operation; creating, by the backup management device in response to the first request, an enhanced recovery asset comprising computing device data items associated with the computing device and stored on a backup storage device; performing a first backup operation of at least one volume of the computing device to obtain a first backup container stored on the backup storage device; performing a second backup operation of system state information associated with the computing device to obtain a second backup container stored on the backup storage device; associating the first backup container and the second backup container with the enhanced recovery asset; receiving, by the backup management device, a second request to perform a recovery operation; and performing, based on the second request, the recovery operation using at least a portion of the enhanced recovery asset.

In general, embodiments described herein relate to a non-transitory computer readable medium comprising computer readable program code, which when executed by a computer processor enables the computer processor to perform a method for performing an enhanced backup and restore for a computing device. The method may include: receiving, at a backup management device, a first request to perform an enhanced backup operation; creating, by the backup management device in response to the first request, an enhanced recovery asset comprising computing device data items associated with the computing device and stored on a backup storage device; performing a first backup operation of at least one volume of the computing device to obtain a first backup container stored on the backup storage device; performing a second backup operation of system state information associated with the computing device to obtain a second backup container stored on the backup storage device; associating the first backup container and the second backup container with the enhanced recovery asset; receiving, by the backup management device, a second request to perform a recovery operation; and performing, based on the second request, the recovery operation using at least a portion of the enhanced recovery asset.

In general, embodiments described herein relate to a system for performing an enhanced backup and restore for a computing device. The system may include a backup management device operatively connected to the computing device and a backup storage device and configured to: receive a first request to perform an enhanced backup operation; create, in response to the first request, an enhanced recovery asset comprising computing device data items associated with the computing device and stored on the backup storage device; perform a first backup operation of at least one volume of the computing device to obtain a first backup container stored on the backup storage device; perform a second backup operation of system state information associated with the computing device to obtain a second backup container stored on the backup storage device; associate the first backup container and the second backup container with the enhanced recovery asset; receive, by the backup management device, a second request to perform a recovery operation; and perform, based on the second request, the recovery operation using at least a portion of the enhanced recovery asset.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for providing a single enhanced file system backup and restore solution for one or more computing devices. In one or more embodiments, such a backup may include backup and restoration of stored information of a computing device (e.g., volume backup(s)) as well as backup of certain system state information (e.g., system state information backup(s)) related to the computing device. In one or more embodiments, such backup capabilities allow for a user to determine what sort of backups they choose to perform, and what sort of restore operations the user chooses to perform using the backup information. In one or more embodiments, the choice of backup type, restore type, and facilitation of the same is performed using and/or by a backup management device, which may be interacted with by a user/administrator, and which may be operatively connected to one or more backup storage devices that store backup information, and one or more computing devices for which backup and/or restore operations may occur.

One form of restore/recovery from a disaster is to perform a restore using the volume backups taken by the backup and restore system. Such a restore may require accessing the volume backups (e.g., over a network). Such access may, for example, occur via booting a computing device to an operating system (OS) that serves as an installation environment, and may include various agents and/or components capable of facilitating a restoration of a computing device environment from backup container(s) (i.e., separate items of backup data, such as one or more volume backups). Such a boot of a computing device may occur, for example, from a connected computer readable medium (e.g., compact disk, network boot scheme, universal serial bus, etc.)

In one or more embodiments, another form of backup and recovery from a disaster scenario includes generating an enhanced recovery asset on a backup storage device. In one or more embodiments, an enhanced recovery asset is an asset that includes various computing device items (e.g., OS type, OS version, computing device infrastructure details, etc.), and which may be associated with various containers of backup information. Such containers may include, for example, one or more volume backups (which may be backed up using a block based backup scheme) and/or one or more containers that include system state information (which may be backed up using a file system based backup scheme) related to a computing device. In one or more embodiments, such an enhanced backup may be performed using, at least in part, the above described booting of a computing device to an installation environment capable of accessing the backup information stored in the various backup containers associated with the enhanced recovery asset. In one or more embodiments, an enhanced recovery asset may be used to perform either of the enhanced restore/recovery that includes system state information, or a restore/recovery using only the volume backup information (e.g., without the system state information).

In one or more embodiments, another form of backup and recovery includes using the aforementioned enhanced recovery asset to restore system state information. In one or more embodiments, system state information restoration/recovery may be performed independently of volume recovery. In one or more embodiments, embodiments described herein facilitate restore/recovery for any one or more system state components (e.g., component object model (COM) framework, active directory, system state index information, application state, database state, etc.). Such a restore/recovery may occur as part of an overall recovery that includes volume data recovery, or may be performed separately to restore any portion of the system state of a computing device, and may be performed offline or online. In one or more embodiments, restoring/recovering system state information may require restarting a computing device.

Figure 1:
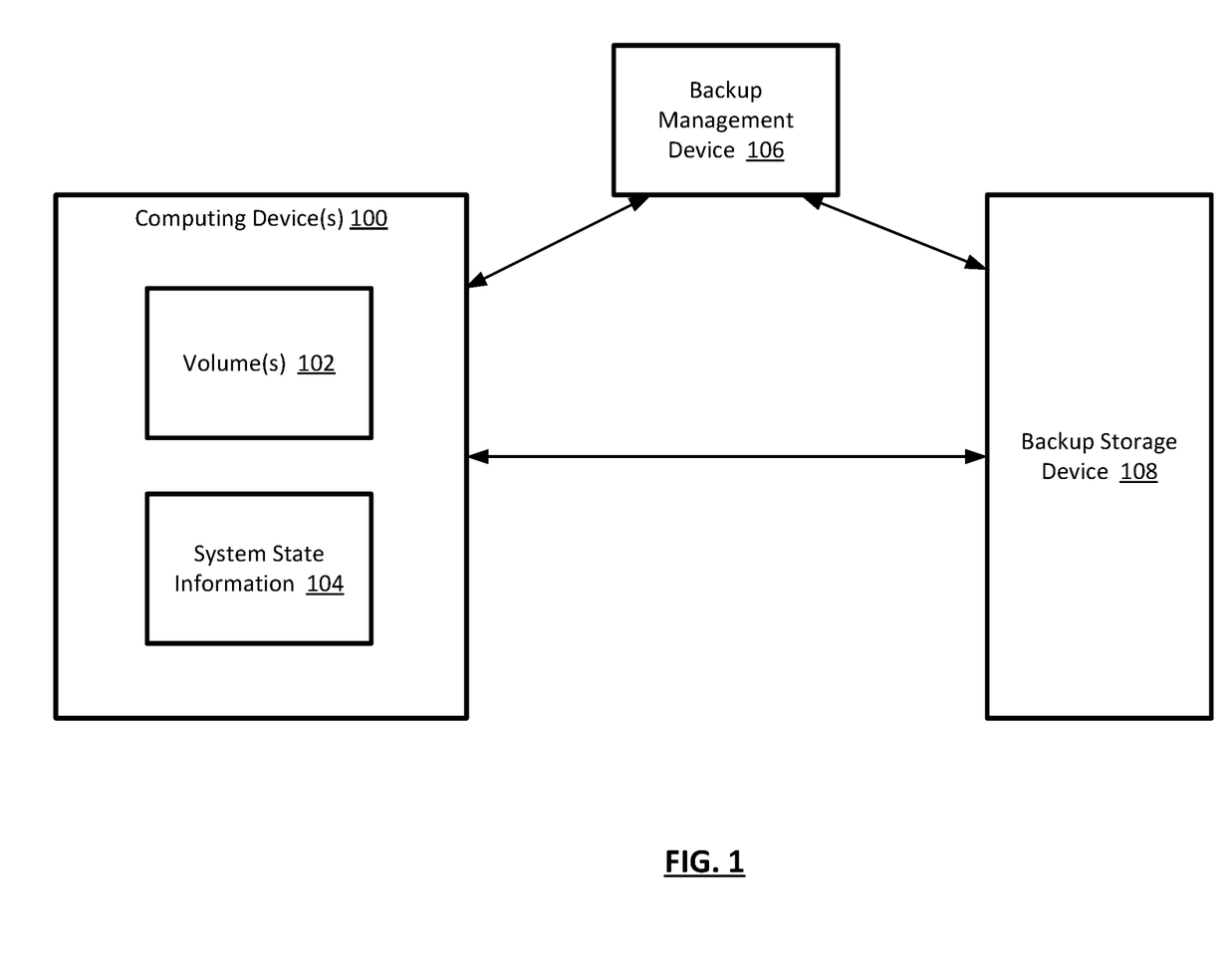
FIG. 1 shows a diagram of a system in accordance with one or more embodiments of the invention.

FIG. 1 shows a diagram of a system in accordance with one or more embodiments described herein. The system may include any number of computing devices (100), each of which may include any number of volumes (102). The computing device (100) may also include system state information (104). The system may also include a backup management device (106). In one or more embodiments, the system may also include any number of backup storage devices (e.g., 108). Each of these components is described below.

In one or more embodiments, a computing device (100) is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention. In one or more embodiments, a set of computing device (100) may form all or a portion of a data domain. In one or more embodiments, a data domain is any set of computing devices (100) for which backup services are performed, such as, for example, data backup, disaster recovery, backup data deduplication, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a computing device (100) any number of volumes (102). In one or more embodiments, a volume (102) is a logically accessible storage drive of a computing system (100). A volume (102) may be part of one or more disk drives, and may include, or not, any number of partitions. In one or more embodiments, a volume (102) stores information relevant to the operation and/or accessible data of a computing device. In one or more embodiments, a volume (102) may be all or part of any type of computing device storage (described above).

In one or more embodiments, system state information (104) is any information related to the state of a computing device at a given time. Such system state information (104) may include, but is not limited to: COM framework information, registry information, active registry information, database information, application information, OS settings information, computing device connectivity information, configuration information, boot information, performance information, etc., and/or any other information pertaining to the state of a computing device.

In one or more embodiments, the system also includes a backup manager device (106). In one or more embodiments, a backup manager device is also a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention. In one or more embodiments, a set of computing device may form all or a portion of a data domain. In one or more embodiments, a data domain is any set of computing devices for which backup services are performed, such as, for example, data backup, disaster recovery, backup data deduplication, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a backup manager device (106) is operatively connected (e.g., via a network) to the computing device (described above) and one or more backup storage devices (108) (described below).

In one or more embodiments, a backup management device (108) includes functionality to facilitate backup and recovery operations for computing devices (100) using, at least in part, backup storage devices (108). In one or more embodiments, a backup manager device (106) includes and/or is operatively connected to an interface through which a user (e.g., a data domain administrator) may configure backup options for computing devices (100), which backup storage devices (108) will receive backup data, what type of backups are to be performed, the frequency of such backups, etc. In one or more embodiments, the backup management device also include functionality to, in response to instruction from a user or automatically (depending on configuration and/or situation), restore/recover a given computing device, either to the same physical device or to a different physical device with similar capabilities. In one or more embodiments, such a restore/recover operation may use an enhanced backup asset. In one or more embodiments, an enhanced recovery asset includes backup information for each volume of a computing device. Such volume backups may use any form of information backup (e.g., block based backup). In one or more embodiments, an enhanced recovery asset also includes system state information of related to a computing device. In one or more embodiments, each type of backup information is associated with the enhanced recovery asset, which also includes other information related to the computing device (e.g., OS type, OS version, computing device infrastructure information, etc.). In one or more embodiments, the enhanced recovery asset is stored on one or more backup storage devices operatively connected to the backup recovery manager. Additionally, or alternatively, the backup manager device may store all or a part of an enhanced recovery asset, which may, in turn, point to the backup information stored on the one or more operatively connected backup storage devices.

In one or more embodiments, volume backup data is stored in one or more containers, which are logical collections of data. In one or more embodiments, system state information backup data is stored in a separate container. In one or more embodiments, system state information containers are created using an OS service designed to create and store shadow copies of system state information at points in time (e.g., a volume shadow copy service). Such an OS service may, for example, facilitate requests for system state backups via a requestor service, which may invoke a writer per component to be backed up, and a provider for each component, to perform a snapshot of the state of the component to be backed up. In one or more embodiments, system state information for a given computing device also includes metadata related to what writers of the aforementioned OS service exist and/or are active, a collection of backup components documents from writers of such an OS service that include data related to what the writers are backing up, and any other information related to the state of the OS at a given time.

In one or more embodiments, the computing devices (100) and the backup management device (106) are operatively connected to one or more backup storage devices (108). In one or more embodiments, a backup storage device (108) is also a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the storage devices (108) include functionality to store backup copies of data of any type for which the source is any of the computing device (100). Such data may include backups of one or more volumes of a computing device, and system state information of a computing device, which may be stored in separate containers and associated with an enhanced recovery asset. Collectively, backup data stored on one or more backup storage devices (108) may include, but is not limited to: storage capacity; system model; operating system type and version information; whether or not data is encrypted when stored on a backup storage device; backup media type (disk, tape, etc.); whether or not garbage collection services are running for a computing device; a number of concurrent backups from computing devices and/or to storage devices; storage characteristics (e.g., information about type of media used for backup, age of media, various attributes of the media, etc.); system model information (e.g., cluster information, generation of system, machine check exception history); information regarding updates and fixes made to an operating system after deployment of the operating system; and/or backup set and encryption engine information (e.g., encryption algorithms used, etc.). Other types of data items may be part of a collection of backup information for a given computing device without departing from the scope of embodiments described herein While FIG. 1 shows a configuration of components, other configurations may be used without departing from the scope of embodiments described herein. Accordingly, embodiments disclosed herein should not be limited to the configuration of components shown in FIG. 1.

Figure 2:
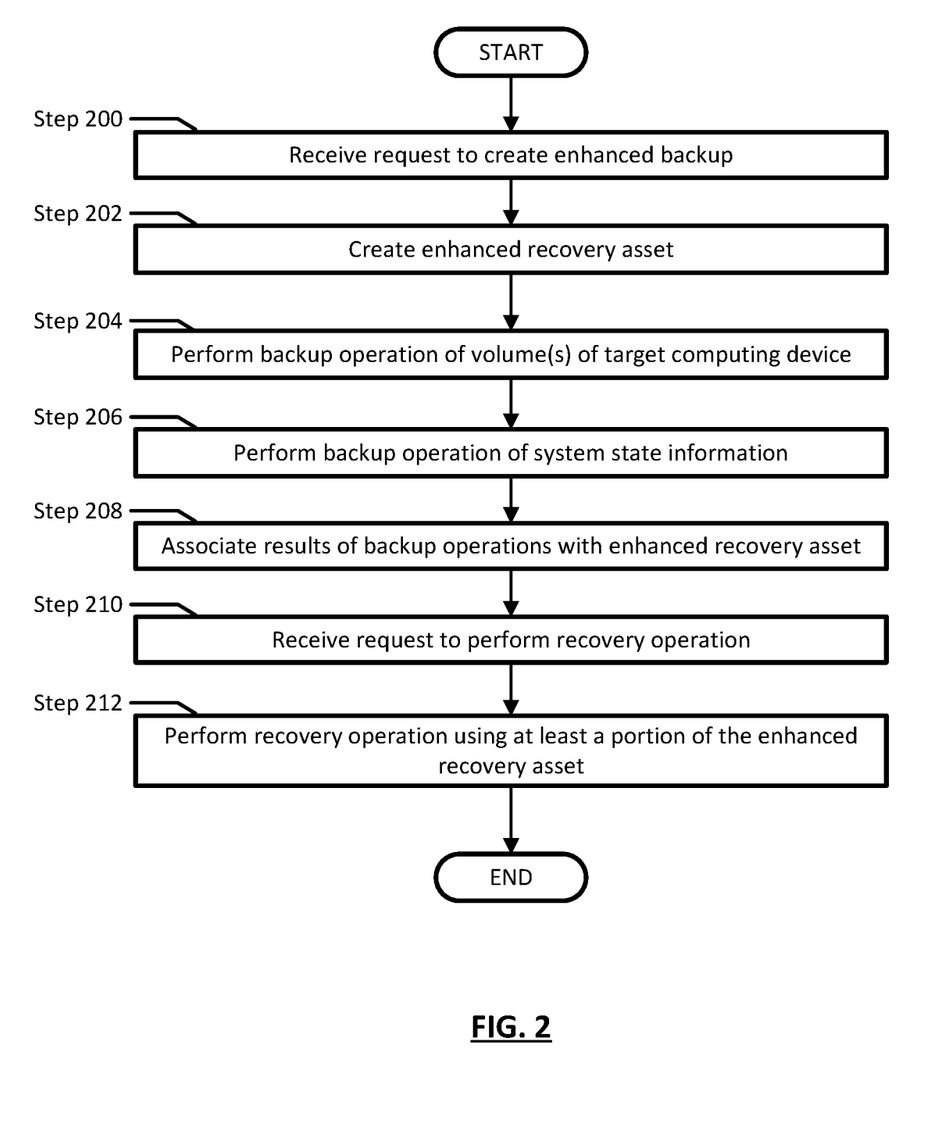
FIG. 2 shows a flowchart in accordance with one or more embodiments of the invention.

FIG. 2 shows a flowchart describing a method for performing an enhanced backup and restore in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 200, a request is received to create an enhanced backup for one or more computing devices. In one or more embodiments, a user interface is presented to an administrator (e.g., of a data domain) that allows the administrator to select a backup type for any number of computing devices in any number of data domains. Such an interface may be facilitated, for example, by a backup manager device. In one or more embodiments, an option exists for the administrator to select an enhanced backup. In one or more embodiments, an enhanced backup will include volume backups for a computing device, as well as system state information backups for the computing device. Such enhanced backups may be scheduled for a single backup, or may be scheduled for any series of backups in any time frame.

In Step 202, in response to the request of Step 200, an enhanced recovery asset is created. In one or more embodiments, a backup manager device creates the enhanced recovery asset. In one or more embodiments, an enhanced recovery asset is a logical construct that includes information about a computing device (e.g., OS type, OS version, computing device infrastructure details, etc.), and also may be associated with various backup information generated from a computing device when the aforementioned backups occur, such as volume backups and system state backups. Such enhanced recovery assets may be stored, for example, on one or more backup storage devices.

In Step 204, a backup operation is performed for one or more volumes of a given computing device. In one or more embodiments, the backup of the one or more volumes of a computing device is a block based backup. In one or more embodiments, a block based backup backs up data of a volume based on blocks of information therein, regardless of how such data is organized by the file system of the computing device. In one or more embodiments, the volume backups are stored in one or more logical containers on a backup storage device. There may be a container per volume, one container for all volumes, or any other organization of any number of volumes in any number of containers without departing from the scope of embodiments described herein.

In Step 206, a backup operation is performed for system state information of the computing device for which the volume backups were performed in Step 204. In one or more embodiments, system state information backup includes using a service of the operating system to capture various portions of the system state information. For example, the volume shadow copy service of a Windows operating system may be used. In one or more embodiments, the backup management device is a requestor that requests the service to create the system state backup. In one or more embodiments, the request causes one or more writers associated with various information of the computing device to cause the backup to happen. Information that may be backed up for the system state backup may include, but is not limited to: COM framework information, registry information, active registry information, database information (e.g., SQL database), application data, etc. In one or more embodiments, system state backup information also includes various items of metadata, such as metadata corresponding to the writers that exist on the computing device, backup components documents from various writers, customized system state index information, and/or any other settings or relevant system state information. In one or more embodiments, the system state information backup is a file based backup, and is accordingly indexed to allow for searchability. In one or more embodiments, the system state information backup is stored as one or more files on a backup storage device and may be stored separately from the volume backups for the computing device, and may be referred to as a separate container.

In Step 208, the one or more containers including volume backup data are associated with the enhanced recovery asset created for the computing device in Step 202. In one or more embodiments, the association of the containers with the enhanced recovery asset may be any form of associating one logical information entity with another. For example, the enhanced recovery asset may be configured to include information related to the location and access information of the volume backup containers as existing in the one or more backup storage devices. In one or more embodiments, the container that includes system state information created in Step 206 is also associated with the enhanced recovery asset.

In Step 210, a request is received to perform a recovery operation. In one or more embodiments, the request is initiated by the backup management device. For example, an administrator may choose to request a recovery operation via the backup management device in the event a disaster has occurred, such as a computing device becoming inoperable.

In Step 212, in response to the request received in Step 210, a recovery operation is performed using at least a portion of the enhanced recovery asset. For example, an administrator may elect to perform a full enhanced recovery, which may include booting a computing device to an installation environment configured to access the backup storage device (e.g., via a network), use the volume backup containers to perform a volume recovery, and then use the system state information backup container to restore the system state of the computing device. As another example, an administrator may elect to only use a portion of the system state information backup to restore a selected portion of the system state (e.g., the registry). As another example, an administrator may elect to only perform a volume backup using a volume backup container.

Figure 3:
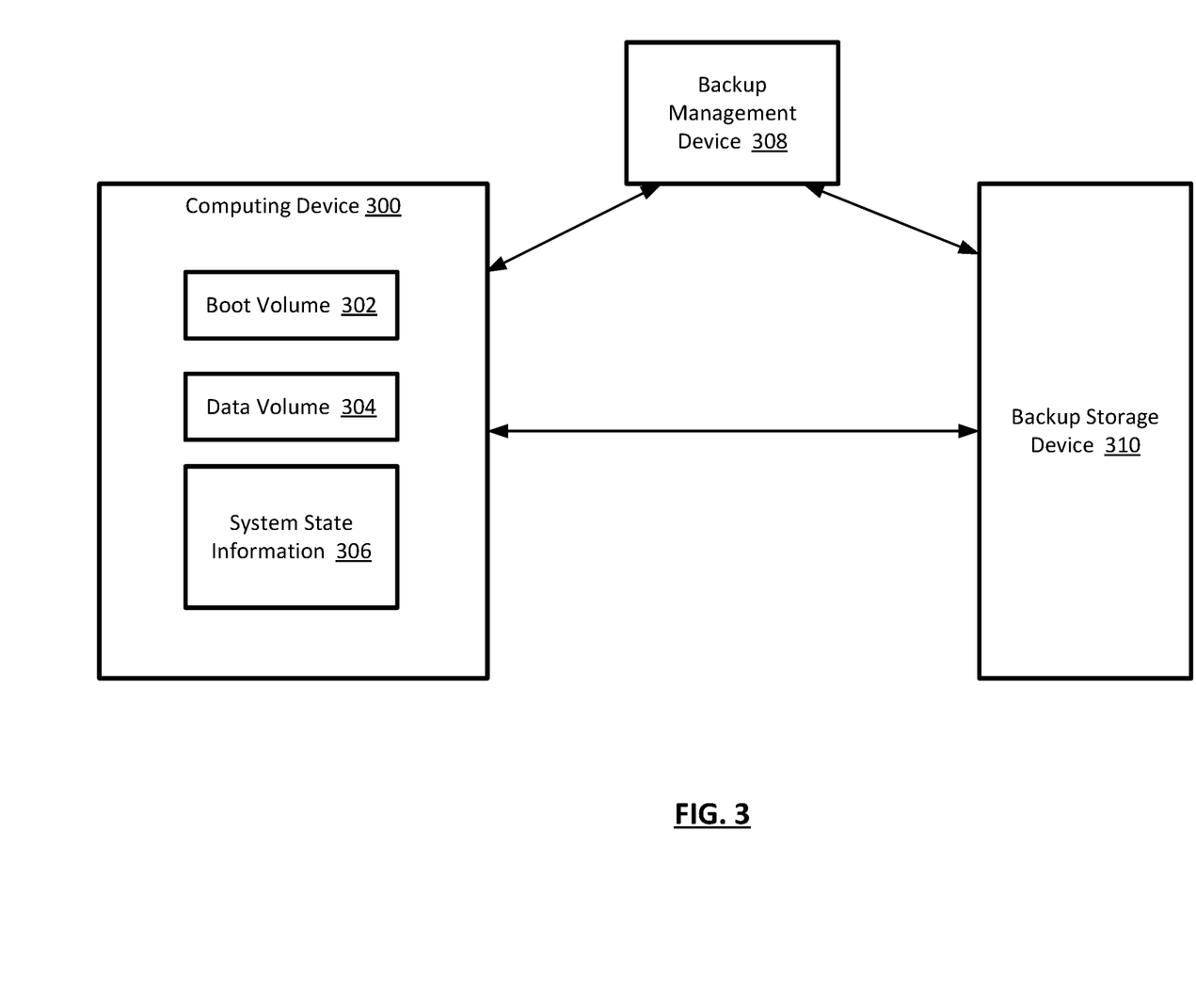
FIG. 3 shows an example in accordance with one or more embodiments of the invention.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which a computing device (300) in a data domain includes a boot volume (302) and a data volume (306), and also includes system state information. In one or more embodiments, an administrator (not shown), using the backup management device (308), configures a daily enhanced backup for the computing device (300) to the backup storage device (310).

In such a scenario, at the scheduled time, an enhanced recovery asset is created for the computing device that includes the operating system type, the operating system version, and a variety of computing device infrastructure details.

Next, the boot volume (302) and the data volume are backed up. In one or more embodiments, the volume backups are performed via block based backup. In one or more embodiments, each of the volumes (302, 304) are stored in separate containers on the backup storage device (310). Next, in one or more embodiments, the volume backups are associated with the enhanced recovery asset.

In one or more embodiments, the system state information is backed up. In one or more embodiments, the system state information is backed up using a file based backup. In one or more embodiments, the system state backup uses a volume shadow copy service (VSS). In one or more embodiments, first, metadata is prepared using the writers of the VSS to obtain metadata of the writers, backup component documents corresponding to the components for which writers exist, and various items of system configuration information. Next, data is stored for components selected by the administrator, and include, in this example, COM framework information, registry information, and application state for a variety of running applications. Next, the system state data is indexed and is stored as a SQL file, along with information indicating that the backup is an enhanced backup. Next, the system state information is stored as a separate container on the backup storage device (310) and associated with the enhanced recovery asset.

Sometime later, a natural disaster occurs, which renders the computing device (300) unable to operate as intended. In response, the administrator, via the backup management device, initiates an enhanced recovery to restore the computing device.

First, the computing device (300) is booted using Windows Pre-Installation Environment (WinPE) as an installation environment, and a disaster recovery is performed to restore the boot volume (302) and the data volume (304) using the volume backup containers from the backup storage device (310) associated with the enhanced recovery asset.

Next, the system state is restored using the system state information backup container associated with the enhanced recovery asset. In one or more embodiments, the system state information recovery is performed by initializing the appropriate writers of VSS, and then recovering the system state information using the aforementioned writers. Next, the computing device (300) is rebooted, and the recovery operation is complete.

Sometime later, after another enhanced backup operation has been performed for the computing device (300), an administrator discovers that part of the registry of the computing device has become corrupted. The administrator then checks the enhanced recovery asset, and discovers that the registry has been successfully backed up as a part of the system state information backup. Therefore, the administrator, using the backup management device (308), requests the VSS perform a backup of the registry component using an appropriate writer. In one or more embodiments, once the registry component has been successfully restored using the enhanced recovery asset, the recovery operation is complete.

Figure 4:
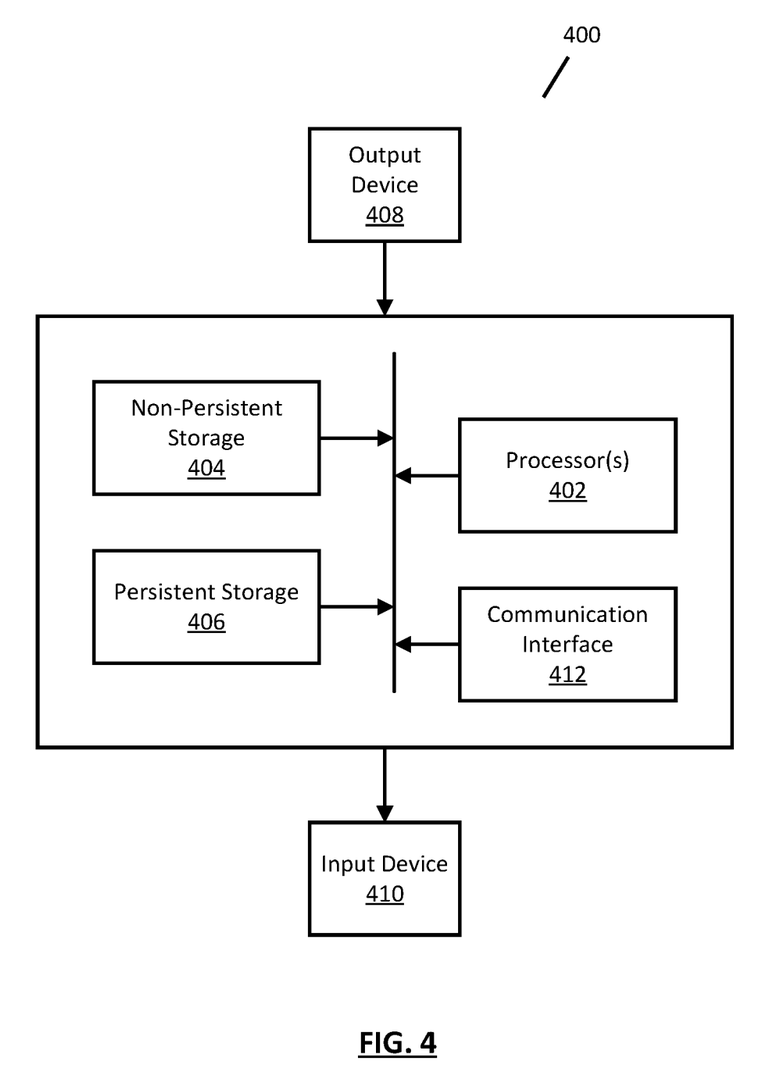
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

In one or more embodiments described herein, the creation of an enhanced recovery asset allows for backups to store both volume backup information as well as system state information. In one or more embodiments, such enhanced recovery assets allow an administrator to perform a variety of backup types using the same enhanced recovery asset. Such backup types may include, but are not limited to, volume recovery, enhanced recovery that includes volume recovery and system state recovery, and/or recovery of all or any portion of system state information.

The problems discussed above should be understood as being examples of problems solved by embodiments of the invention of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing an enhanced backup and restore for a computing device, the method comprising:
    receiving, at a backup management device, a first request to perform an enhanced backup operation;
    creating, by the backup management device in response to the first request, an enhanced recovery asset comprising computing device data items associated with the computing device and stored on a backup storage device;
    performing a first backup operation of at least one volume of the computing device to obtain a first backup container stored on the backup storage device;
    performing a second backup operation of system state information associated with the computing device to obtain a second backup container stored on the backup storage device;
    associating the first backup container and the second backup container with the enhanced recovery asset;
    receiving, by the backup management device, a second request to perform a recovery operation; and
    performing, based on the second request, the recovery operation using at least a portion of the enhanced recovery asset.

2. The method of claim 1, wherein the recovery operation is a full enhanced recovery operation comprising:
    performing a disaster recovery operation using the first backup container;
    performing, after the disaster recovery operation, a system state recovery operation using the second backup container; and
    rebooting the computing device after the system state recovery operation completes.

3. The method of claim 2, wherein the disaster recovery operation comprises booting the computing device to an installation environment operating system, wherein the installation environment operating system accesses the first backup container from the backup storage device.

4. The method of claim 1, wherein the recovery operation comprises:
    performing a restoration of the system state information using the second backup container; and
    rebooting the computing device after a system state recovery operation completes comprising the restoration of the system state information.

5. The method of claim 1, wherein the recovery operation is a disaster recovery operation using the first backup container but not the second backup container.

6. The method of claim 1, wherein the recovery operation comprises performing a component recovery of at least one system state component using the second backup container.

7. The method of claim 1, wherein the second backup operation comprises:
    using a plurality of writers of an operating system shadow copy framework to perform a plurality of component backup operations for a plurality of system state components to obtain a plurality of system state component backups;
    obtaining metadata associated with the system state information; and
    creating an index of the metadata to generate a browseable listing of the metadata.

8. The method of claim 7, wherein the index comprises writer metadata items, backup components document information, and a system state information index.

9. The method of claim 7, wherein the plurality of system state components comprises a component object model framework component, a registry component, and an application component.

10. The method of claim 7, further comprising:
    creating the second backup container, wherein the second backup container comprises an indication that the enhanced recovery asset is based on an enhanced backup created in response to the first request.

11. The method of claim 1, wherein the first backup operation comprises performing a block based backup of the at least one volume to obtain the first backup container.

12. The method of claim 1, wherein the second backup operation comprises performing a file based backup of the system state information.

13. The method of claim 1, wherein the computing device data items of the enhanced recovery asset include an operating system type, an operating system version, and host infrastructure information.

14. The method of claim 1, wherein an alert is sent to the backup management device to alert an administrator that the recovery operation is complete.

15. A non-transitory computer readable medium comprising computer readable program code, which when executed by a computer processor enables the computer processor to perform a method for performing an enhanced backup and restore for a computing device, the method comprising:
    receiving, at a backup management device, a first request to perform an enhanced backup operation;
    creating, by the backup management device in response to the first request, an enhanced recovery asset comprising computing device data items associated with the computing device and stored on a backup storage device;
    performing a first backup operation of at least one volume of the computing device to obtain a first backup container stored on the backup storage device;
    performing a second backup operation of system state information associated with the computing device to obtain a second backup container stored on the backup storage device;
    associating the first backup container and the second backup container with the enhanced recovery asset;
    receiving, by the backup management device, a second request to perform a recovery operation; and
    performing, based on the second request, the recovery operation using at least a portion of the enhanced recovery asset.

16. The non-transitory computer readable medium of claim 15, wherein the recovery operation is a full enhanced recovery operation comprising:
    performing a disaster recovery operation using the first backup container;
    performing, after the disaster recovery operation, a system state recovery operation using the second backup container; and
    rebooting the computing device after the system state recovery operation completes.

17. The non-transitory computer readable medium of claim 16, wherein the disaster recovery operation comprises booting the computing device to an installation environment operating system, wherein the installation environment operating system accesses the first backup container from the backup storage device.

18. The non-transitory computer readable medium of claim 15, wherein the recovery operation comprises:
    performing a restoration of the system state information using the second backup container; and rebooting the computing device after a system state recovery operation completes comprising the restoration of the system state information.

19. The non-transitory computer readable medium of claim 15, wherein the recovery operation is a disaster recovery operation using the first backup container but not the second backup container.

20. A system for performing an enhanced backup and restore for a computing device:
- a backup management device operatively connected to the computing device and a backup storage device and configured to:
  - receive a first request to perform an enhanced backup operation;
  - create, in response to the first request, an enhanced recovery asset comprising computing device data items associated with the computing device and stored on the backup storage device;
  - perform a first backup operation of at least one volume of the computing device to obtain a first backup container stored on the backup storage device;
  - perform a second backup operation of system state information associated with the computing device to obtain a second backup container stored on the backup storage device;
  - associate the first backup container and the second backup container with the enhanced recovery asset;
  - receive, by the backup management device, a second request to perform a recovery operation; and
  - perform, based on the second request, the recovery operation using at least a portion of the enhanced recovery asset.

* * * * *